Patented Aug. 5, 1941

2,251,752

UNITED STATES PATENT OFFICE 2,251,752

SIZED REGENERATED CELLULOSIC PELLICLE

James A. Mitchell, Kenmore, N. Y., assignor to E. I. du Pont de Nemours & Company, Wilmington, Del., a corporation of Delaware No Drawing. Application July 23, 1938, Serial No. 221,020

21 Claims. (Cl. 91—68)

This invention relates to non-fibrous pellicles, and it more particularly pertains to improved thin, flexible sheets and films of regenerated cellulose.

Thin, flexible regenerated cellulose pellicles are prepared commercially by coagulation and regeneration, followed by purification, impregnation of the wet or gel film with an aqueous solution of a suitable softener, usually glycerol, the softened film then being dried. Such film is designated in the trade as plain film, as distinct from those varieties which are given a subsequent treatment, such as a lacquering treatment to impart a coating, such as a moistureproofing coating.

Commercial, thin, flexible, plain regenerated cellulose pellicles usually contain, when manufactured, 5% to 8% moisture and 9% to 15% softener, these percentages being based on the weight of the dry cellulose. The softener, e. g., glycerol, having a very low volatility, remains practically unchanged in concentration in the sheet over a long period of time. The moisture content in the sheet, however, is subject to wide and sometimes rapid fluctuations depending on the moisture content of the air to which the sheet is exposed.

It is most desirable that thin, regenerated cellulose sheeting be properly softened, that is, flexible and durable, under a wide variety of atmospheric conditions. In an atmosphere of medium to high relative humidity such film is found to have adequate durability and flexibility if it contains from 9% to 15% glycerol, based on the dry weight of the cellulose. In atmospheres of low relative humidity such as obtains in dry climates and in the cold weather of the northern climates, thin, regenerated cellulose film containing from 9% to 15% glycerol becomes quite fragile, due to the loss of a substantial amount of contained moisture, and it has been suggested that in order to overcome this difficulty the glycerol content be greatly increased in order to insure the retention of an adequate amount of moisture in the film.

However, the increase of the glycerol contained in the film to an amount substantially in excess of 15%, based on the weight of the dry cellulose, is impractical for certain reasons. For example, thin, plain transparent regenerated cellulose films are very smooth and pliable and when such films are stacked in cut sheets on one another or wound tightly on rolls air is expelled from between the sheets, causing great difficulty in separation thereof. In addition, the high content of softener imparts relatively great surface tackiness and tendency towards cohesion of adjacent sheets. Even when the glycerol content is 15%, precautions must be taken to prevent absorption of too much moisture, such precautions being, for example, the storing of the stacked sheets or rolls in a properly humidified room, wrapping with moistureproof material during storage, avoiding long periods of storage, storing under as little pressure as possible, etc. It will be understood, in this discussion, that increased moisture content generally increases the tendency towards tackiness of the surface of the sheet. It has previously been proposed to deposit on such thin, flexible regenerated cellulose sheets a substantially invisible layer of very fine solid particles of inorganic material, in order to increase surface slip and sticking resistance. However, films so treated exhibit less affinity for the usual aqueous adhesives used to bond such films to themselves, as in the making of bags, and to other materials, such as paper labels, the strength of the adhesive bond at seams and closures of articles made from such films being very weak. The reason for the decreased receptivity towards adhesives of films treated with such deposits which have been applied for the purpose of improving slip probably lies in the fact that the water in the aqueous adhesive has difficulty in penetrating the thin surface layer of the size.

In addition, proposed methods for applying sizes to thin, regenerated cellulose film are generally characterized by application of the size from an aqueous bath prior to the drying of the film; the choice of sizing materials is thus limited to those which are soluble or dispersible in aqueous media, and which will not be adversely affected by the heat of the drying operation. In addition, since the film at this point is in the gel state, a certain amount of the sizing material may penetrate to the interior of the film where it serves no useful purpose as far as slip is concerned, and such penetration may adversely affect the transparency and appearance of the sheet.

It is an object of this invention to produce a new and useful thin, flexible film having good slip characteristics. Another object comprehends the production of new and useful thin and flexible films comprising a substantially non-fibrous, non-porous material, such as regenerated cellulose having improved resistance to breaking when subjected to low humidities, for example, during cold weather. A further object of this invention pertains to improvement in the sticking resistance of thin, flexible cellulosic film. Another object comprises the production of thin, flexible film of high sticking resistance, having also improved receptivity for aqueous adhesives. It is a still further object to provide improved means for sizing such non-fibrous, non-porous material. Other objects of the invention will appear hereinafter.

In general, the objects of this invention are attained by depositing upon the surface of the thin, non-fibrous, non-porous film, preferably after said film has been formed and dried, a solid wax-like ketone. These ketones may be applied to the surface of said film as dilute aqueous dispersions, or solution in organic solvents; preferably, they are applied by spraying such solutions. Optionally, other insoluble materials, such as finely divided clays, and certain wetting agents, well known to the art, may also be included in the surface layer on the cellulose film. Such a layer may be applied to one or both sides of the film.

The invention will be described with specific reference to thin pellicles of regenerated cellulose, such as are suitable for use as wrapping tissue, although it is to be understood that the invention contemplates broadly the treatment of thin pellicles of materials other than regenerated cellulose.

The following examples illustrate various embodiments of the invention.

Example I

A thin, plain, transparent regenerated cellulose pellicle, having a thickness when dry of about 0.0088 inch, prepared in the usual manner, that is, impregnated with a softener such as glycerol and dried, is passed through a suitable chamber in which are located several sprays so arranged as to give an even distribution of deposit upon both surfaces of the film. The spray apparatus is charged with a solution consisting of 20 parts lauric acyloin dissolved in 1000 parts of toluene, and the rate of travel of the cellulose pellicle, and the rate of application of the solution to the surface of the pellicle is so adjusted that approximately 8 grams of solution is applied per square meter of surface, i. e., 16 grams of solution per square meter of film (both sides). The pellicle then leaves this chamber and traverses another chamber supplied with a circulating system of heated air or other means of removing the solvent from the treated film. After all of the solvent has been removed, the film is wound up into a roll.

Example II

A solution consisting of 12 parts of palmitic acyloin dissolved in 1000 parts of toluene is applied to plain, transparent regenerated cellulose film, in the manner set forth in Example I, so as to deposit on the film 10 grams of solution per square meter of surface.

Example III

A solution consisting of 16 parts stearic acyloin dissolved in 1000 parts of toluene is applied to plain, transparent regenerated cellulose film, in the manner set forth in Example I, so as to deposit on the film 10 grams of solution per square meter of surface.

Example IV

A solution consisting of 3 parts soap (sodium stearate) and 11 parts of lauric acyloin dissolved in 500 parts of ethyl alcohol and 500 parts toluene is applied to plain, transparent regenerated cellulose film, in the manner set forth in Example I, so as to deposit on the film 10 grams of solution per square meter of surface.

Example V

A solution consisting of 6 parts lauric acyloin and 6 parts stearyl amine dissolved in 1000 parts of toluene is applied to plain, transparent regenerated cellulose film, in the manner set forth in Example I, so as to deposit on the film 10 grams of solution per square meter of film.

Example VI

A solution consisting of 20 parts diphenyl heptadecyl ketone dissolved in 1000 parts of toluene is applied to plain, transparent regenerated cellulose film, in the manner set forth in Example I, so as to deposit on the film 8 grams of solution per square meter of surface.

Example VII

A solution consisting of 4 parts zinc stearate and 12 parts diphenyl heptadecyl ketone dissolved in 1000 parts of toluene is applied to plain, transparent regenerated cellulose film, in the manner set forth in Example I, so as to deposit on the film 8 grams of solution per square meter.

Example VIII

A solution consisting of 20 parts phenoxyphenyl heptadecyl ketone dissolved in 1000 parts of toluene is applied to plain, transparent regenerated cellulose film, in the manner set forth in Example I, so as to deposit on the film 8 grams of solution per square meter.

Example IX

A solution consisting of 20 parts 12-ketostearin dissolved in 1000 parts toluene is appleid to plain, transparent regenerated cellulose film, in the manner set forth in Example I, so as to deposit on the film 8 grams of solution per square meter.

Example X

A solution consisting of 25 parts dilauryl ketone dissolved in 1000 parts of toluene is applied to plain, transparent regenerated cellulose film, in the manner set forth in Example I, so as to deposit on the film 8 grams of solution per square meter of surface.

Each of the sized pellicles prepared according to each of the foregoing examples is perfectly transparent, and even after several days, exhibits no substantial tendency to stick when stacked on each other in an atmosphere of 80% relative humidity, at 25° C. and under a pressure of one pound per square inch, the sheets being 6 inches square. Additionally, the films prepared according to the above examples show an affinity towards aqueous adhesives comparing favorably with that of unsized sheets of the same material and thickness.

According to the invention, the anti-sticking agents are applied to thin, regenerated cellulose sheets either during or after impregnation with the softener in such a manner that practically no impairment in the appearance or the performance of the dried product results. While it is preferable to apply these sizing materials after the sheet has been purified, washed and impregnated with softener, and either before or after the drying operation has taken place, it may be desirable, under certain circumstances, to apply these materials as dispersions in the bath used to impregnate with softener. In general, however, it is to be preferred that solutions of these materials are first formed in suitable solvents such as toluene, alcohol, benzene, etc., and these solutions applied as a very thin, discontinuous film upon the surface of the pellicle. This is most advantageously accomplished by spraying the solution upon the surface of a traveling web and removing the solvents after application to the surface of the web. The small droplets of solution, upon evaporation of the solvent, produce a finely divided discontinuous coating of a wax-like ketone upon the surface of the film.

In some cases, it may be desirable to spray the solution of the ketone onto the surface of the sheet through a drying atmosphere, whereby most of the solvent is removed before the spray hits the surface of the film. In this form, part of the ketone has already been precipitated and what solvent remains serves as adhesive for adhering the dust-like particles to the film surface.

If it is desired, the insoluble ketone sizes may be applied to the film as aqueous dispersions from treatment baths, sprays, dip rolls, etc. For this purpose, the addition of suitable dispersing agents such as triethanolamine, soluble soaps, etc., may be made.

Preferably, only very minute quantities of antisticking substances are applied to the transparent regenerated cellulose pellicles, which substances, after drying of the pellicle, will usually and preferably amount to less than 2% of the weight of the pellicle, and may even amount to as little as a few hundredths of a percent.

In carrying out the sizing treatment, the dispersion or solution should be so prepared and the quantity should be so controlled, and drying should be so carried out that the final product is substantially not inferior to similar unsized products, particularly in retention of transparency, in brilliance and receptiveness of the usual aqueous adhesive.

The sizing agents may be applied to gel pellicles, that is, pellicles which have been purified and washed but have not been subjected to a drying operation, or they may be applied to a dry film, or to a wet film which has been rewetted after drying.

The ketones which are preferred for use in this process are all classed as insoluble in water and are solid wax-like materials. In general, they have a melting point greater than 35° C. and a solubility in water of less than 2% at ordinary temperatures. They may contain aryl or alkyl or alicyclic constituents or combinations of these constituents. Examples illustrating these types of compounds are lauric acyloin (lauroin), palmitic acyloin (palmitoin), stearic acyloin (stearoin), 12-keto-stearin, phenoxyphenyl heptadecyl ketone, diphenyl heptadecyl ketone, dilauryl ketone (laurone), diphenyl tridecyl ketone, diphenyl undecyl ketone, p-methyl-diphenyl heptadecyl ketone, phenoxyphenyl tridecyl ketone, phenoxphenyl undecyl ketone, p-methyl-phenoxyphenyl heptadecyl ketone, 2-furyl heptadecyl ketone, 2-furyl undecyl ketone, 5-methyl-2-furyl heptadecyl ketone, 2-dibenzofuryl heptadecyl ketone, 2-dibenzofuryl undecyl ketone, 2-stearylcarbazole, 2-laurylcarbazole, 2,8-distearylcarbazole, 2,8-dipalmitylcarbazole, 2,8-dimyristylcarbazole, 2,8-dilaurylcarbazole, 2-laurylthiophene, alpha-naphthyl heptadecyl ketone, alpha-naphthyl undecyl ketone.

If desired, mixtures of the wax-like ketones may be used to advantage. Additionally, the wax-like ketones may be applied in admixture with other sizing materials such as stearyl amine, zinc stearate, ordinary soap, and argillaceous materials such as bentonite, china clay and aluminum silicate. For example, the composition of Example V in which the size comprises lauroin together with stearyl amine produces a film of better transparency than when lauroin alone is used as in Example I.

As organic solvents for the wax-like ketones may be mentioned toluene, benzene, petroleum hydrocarbon fractions, ethyl acetate, ethyl alcohol, acetone, methyl cellosolve, ether, chlorinated hydrocarbon solvents and mixtures of these materials.

The invention in its preferred form contemplates the use of glycerol as the cellulose softener. It is to be understood, however, that any water-soluble, substantially non-volatile cellulose softener may be used, such as diethylene glycol, triethylene glycol, invert cane sugar, glucose, sorbitol, calcium chloride, triethanolamine, carbamide, etc., or suitable combinations of such softeners. The invention, in its broad scope, is independent, however, of the type of softener used and indeed relatively volatile softeners may be used, or the softener may be omitted if occasion demands.

Although transparent pellicles are to be preferred, it is within the scope of the invention to use pigmented, colored or otherwise decorated pellicles.

Although the process of this invention is particularly applicable to pellicles of regenerated cellulose, whether produced by the cuprammonium or viscose processes, it is also applicable to other cellulosic pellicles which are smooth, thin, non-fibrous, substantially non-porous, particularly those water-sensitive cellulosic pellicles such as may be obtained by coagulation and/or precipitation from aqueous cellulosic dispersions, including cellulose ethers, such as glycol cellulose, lowly substituted methyl or ethyl cellulose, cellulose glycolic acid, or cellulose phthalic acid; lowly esterified cellulose esters or ether-esters and the like. While the invention is most particularly concerned with water-sensitive films such as regenerated cellulose and the various materials just mentioned, the broad scope of the invention includes the application of the wax-like ketones to other non-fibrous films such as those prepared from acetone-soluble cellulose acetate, rubber hydrochloride, cellulose nitrate, including also regenerated cellulose coated with a moistureproofing composition, and including also cellulose derivatives other than cellulose acetate which are soluble in organic solvents, e. g., highly alkylated cellulose such as highly ethylated cellulose.

The use of these insoluble ketones not only gives great sticking resistance to the film so treated, but likewise, provides a film for which adhesive bonds of great strength may be obtained with the ordinary aqueous adhesives. In some cases, the adhesive bond may be further improved by the incorporation of a wetting agent in the solution to be applied by spray or in the treatment bath. This wetting agent, if deposited upon the surface of the film, will aid in the penetration of the adhesive to the base sheet. Wetting agents which may be used for this purpose are soluble soaps such as potassium stearate, sodium stearate, triethanolamine stearate, Monopole oil, sodium ricinoleate, and water-soluble salts (particularly the sodium salts) of the half esters of sulfuric acid and alcohols in which the aliphatic radical contains at least 8 and preferably 12 to 18 carbon atoms, such as sodium lauryl sulfate, sodium myristyl sulfate, sodium acetyl sulfate, sodium oleyl sulfate and sodium stearyl sulfate. Mixtures of these wetting agents are sometimes preferred.

Thin, flexible sheets of the kind referred to, when sized with materials of this invention, show very great resistance to sticking and caking when stacked and stored under pressure. It is furthermore apparent that a sizing or anti-sticking agent which will improve the sticking resistance of regenerated cellulose pellicles and at the same time permit the pellicles to remain receptive to aqueous adhesives which are satisfactory for use with untreated pellicles constitutes an outstanding contribution to the art. Needless to say, there are many uses to which cellulosic pellicles of the type described may be put wherein the anti-sticking characteristic is of major import while the receptivity to aqueous adhesives is of little concern. In such cases, a pellicle having improved sticking resistance, regardless of its receptivity to aqueous adhesives, will be useful and the production of such pellicles is well within the scope of the present invention.

Percentages, parts and proportions referred to herein are intended to be percentages, parts and proportions by weight, unless otherwise specified.

Any variations or modifications of the invention as described above which conform to the spirit of the invention are intended to be included within the scope of the claims.

I claim:

1. The process which comprises spraying a thin, plain, transparent, softened, regenerated cellulosic pellicle with a solution consisting of 16 parts stearic acyloin dissolved in 1000 parts of toluene, at such a rate that approximately 10 grams of solution are applied per square meter of surface, and thereafter drying.

2. A thin, flexible, transparent, non-fibrous pellicle having a surface size consisting essentially of a substantially invisible discontinuous layer of evenly distributed fine solid particles of wax-like ketone, the amount of said size not exceeding 2% by weight of the dried product, not practically impairing the transparency of the dried product, causing it to resist sticking and caking when stacked, and permitting it to remain receptive to aqueous adhesives.

3. A thin, flexible, transparent, non-fibrous cellulosic pellicle having a surface size consisting essentially of a substantially invisible discontinuous layer of evenly distributed fine solid particles of wax-like ketone in an amount sufficient to prevent sticking at 25° C. and 80% relative humidity under a pressure of one pound per square inch, but not exceeding 2% by weight of the dried product, the size not practically impairing the transparency of the dried product, and permitting it to remain receptive to aqueous adhesives.

4. A thin, flexible, transparent, regenerated cellulose pellicle having a surface size consisting essentially of a substantially invisible discontinuous layer of evenly distributed fine solid particles of wax-like ketone in an amount sufficient to prevent sticking at 25° C. and 80% relative humidity under a pressure of one pound per square inch, but not exceeding 2% by weight of the dried product, the size not practically impairing the transparency of the dried product, and permitting it to remain receptive to aqueous adhesives.

5. A thin, flexible, transparent, non-fibrous pellicle having a surface size consisting essentially of a substantially invisible discontinuous layer of evenly distributed fine solid particles of stearic acyloin, the amount of said size not exceeding 2% by weight of the dried product, not practically impairing the transparency of the dried product, causing it to resist sticking and caking when stacked, and permitting it to remain receptive to aqueous adhesives.

6. A thin, flexible, transparent, non-fibrous pellicle having a surface size consisting essentially of a substantially invisible discontinuous layer of evenly distributed fine solid particles of diphenyl heptadecyl ketone, the amount of said size not exceeding 2% by weight of the dried product, not practically impairing the transparency of the dried product, causing it to resist sticking and caking when stacked, and permitting it to remain receptive to aqueous adhesives.

7. A thin, flexible, transparent, non-fibrous pellicle having a surface size consisting essentially of a substantially invisible discontinuous layer of evenly distributed fine solid particles of lauric acyloin, the amount of said size not exceeding 2% by weight of the dried product, not practically impairing the transparency of the dried product, causing it to resist sticking and caking when stacked, and permitting it to remain receptive to aqueous adhesives.

8. The process of improving surface characteristics of a thin, flexible, transparent, non-fibrous pellicle which comprises imposing on a surface of said pellicle a size consisting essentially of a substantially invisible discontinuous layer of evenly distributed fine solid particles of wax-like ketone, the amount of said size not exceeding 2% by weight of the dried product, not practically impairing the transparency of the dried product, causing it to resist sticking and caking when stacked, and permitting it to remain receptive to aqueous adhesives.

9. The process of improving surface characteristics of a thin, flexible, transparent, non-fibrous cellulosic pellicle which comprises imposing on a surface of said pellicle a size consisting essentially of a substantially invisible discontinuous layer of evenly distributed fine solid particles of wax-like ketone in an amount sufficient to prevent sticking at 25° C. and 80% relative humidity under a pressure of one pound per square inch, but not exceeding 2% by weight of the dried product, the size not practically impairing the transparency of the dried product, and permitting it to remain receptive to aqueous adhesives.

10. The process of improving surface characteristics of a thin, flexible, transparent, regenerated cellulose pellicle which comprises imposing on a surface of said pellicle a size consisting essentially of a substantially invisible discontinuous layer of evenly distributed fine solid particles of wax-like ketone, the amount of said size not exceeding 2% by weight of the dried product, not practically impairing the transparency of the dried product, causing it to resist sticking and caking when stacked, and permitting it to remain receptive to aqueous adhesives.

11. The process of improving surface characteristics of a thin, flexible, transparent, non-fibrous pellicle which comprises imposing on a surface of said pellicle a size consisting essentially of a substantially invisible discontinuous layer of evenly distributed fine solid particles of stearic acyloin, the amount of said size not exceeding 2% by weight of the dried product, not practically impairing the transparency of the dried product, causing it to resist sticking and caking when stacked, and permitting it to remain receptive to aqueous adhesives.

12. The process of improving surface characteristics of a thin, flexible, transparent, non-fibrous pellicle which comprises imposing on a surface of said pellicle a size consisting essentially of a substantially invisible discontinuous layer of evenly distributed fine solid particles of diphenyl heptadecyl ketone, the amount of said size not exceeding 2% by weight of the dried product, not practically impairing the transparency of the dried product, causing it to resist sticking and caking when stacked, and permitting it to remain receptive to aqueous adhesives.

13. The process of improving surface characteristics of a thin, flexible, transparent, non-fibrous pellicle which comprises imposing on a surface of said pellicle a size consisting essentially of a substantially invisible discontinuous layer of evenly distributed fine solid particles of lauric acyloin, the amount of said size not exceeding 2% by weight of the dried product, not practically impairing the transparency of the dried product, causing it to resist sticking and caking when stacked, and permitting it to remain receptive to aqueous adhesives.

14. The process of claim 8 characterized in that the said ketone is applied to the pellicle from a liquid medium containing a wetting agent.

15. The process of claim 8 characterized in that the said ketone is applied to the pellicle from a liquid medium containing stearyl amine.

16. A thin, flexible, transparent, regenerated cellulose pellicle having a surface size consisting essentially of a discontinuous layer of evenly distributed fine solid particles of stearic acyloin, the amount of stearic acyloin per square meter of surface being $160/1016$ gram.

17. The process of improving the surface characteristics of a thin, flexible, transparent, regenerated cellulose pellicle which comprises imposing on a surface of said pellicle a size consisting essentially of a substantially invisible discontinuous layer of evenly distributed fine solid particles of wax-like ketone in an amount sufficient to prevent sticking at 25° C. and 80% relative humidity under a pressure of one pound per square inch, but not exceeding 2% by weight of the dried product, the size not practically impairing the transparency of the dried product, and permitting it to remain receptive to aqueous adhesives.

18. The product of claim 12 when the size is present in an amount sufficient to prevent sticking at 25° C. and 80% relative humidity under a pressure of one pound per square inch, but not exceeding 2% by weight of the dried product, not practically impairing the transparency of the dried product, causing it to resist caking when stacked, and permitting it to remain receptive to aqueous adhesives.

19. The process of improving surface characteristics of a thin, flexible, transparent, non-fibrous pellicle which comprises imposing on a surface of said pellicle a wax-like ketone size from a liquid medium, said size consisting essentially of a substantially invisible discontinuous layer of evenly distributed fine solid particles of the wax-like ketone, the amount of said size not exceeding 2% by weight of the dried product, not practically impairing the transparency of the dried product, causing it to resist sticking and caking when stacked, and permitting it to remain receptive to aqueous adhesives.

20. The process of improving surface characteristics of a thin, flexible, transparent, non-fibrous pellicle which comprises imposing on a surface of said pellicle a wax-like ketone size from a solution in an organic solvent, said size consisting essentially of a substantially invisible discontinuous layer of evenly distributed fine solid particles of the wax-like ketone, the amount of said size not exceeding 2% by weight of the dried product, not practically impairing the transparency of the dried product, causing it to resist sticking and caking when stacked, and permitting it to remain receptive to aqueous adhesives.

21. A process of improving surface characteristics of a thin, flexible, transparent, non-fibrous pellicle, which comprises spraying an organic solvent solution of a wax-like ketone on said pellicle, and thereafter removing the solvent, to impose on the surface of said pellicle a wax-like ketone size, said size consisting essentially of a substantially invisible discontinuous layer of evenly distributed fine solid particles of the wax-like ketone, the amount of said size not exceeding 2% by weight of the dried product, not practically impairing the transparency of the dried product, causing it to resist sticking and caking when stacked, and permitting it to remain receptive to aqueous adhesives.

JAMES A. MITCHELL.